(12) United States Patent
Joesten

(10) Patent No.: US 11,446,830 B2
(45) Date of Patent: Sep. 20, 2022

(54) FASTENING DEVICE FOR A SUPPLY HOSE AND/OR A SUPPLY LINE FOR FASTENING TO AN INDUSTRIAL-ROBOT ARM

(71) Applicant: Bizlink Industry Germany GmbH, Roth (DE)

(72) Inventor: Bernd Joesten, Hemminge (DE)

(73) Assignee: Bizlink Industry Germany GmbH, Roth (DE)

( * ) Notice: Subject to any disclaimer, the term of this patent is extended or adjusted under 35 U.S.C. 154(b) by 230 days.

(21) Appl. No.: 16/496,217

(22) PCT Filed: Feb. 23, 2018

(86) PCT No.: PCT/DE2018/200015
§ 371 (c)(1),
(2) Date: Sep. 20, 2019

(87) PCT Pub. No.: WO2018/177482
PCT Pub. Date: Oct. 4, 2018

(65) Prior Publication Data
US 2020/0055201 A1 Feb. 20, 2020

(30) Foreign Application Priority Data
Mar. 31, 2017 (DE) .................... 10 2017 107 043.5

(51) Int. Cl.
*F16L 3/00* (2006.01)
*B25J 19/00* (2006.01)
(Continued)

(52) U.S. Cl.
CPC ............ *B25J 19/0025* (2013.01); *F16L 3/015* (2013.01); *F16L 3/1091* (2013.01); *F16L 3/16* (2013.01); *F16L 33/03* (2013.01); *F16L 33/035* (2013.01)

(58) Field of Classification Search
CPC ...... B25J 19/0025; F16L 3/015; F16L 3/1091; F16L 3/16; F16L 3/02; F16L 3/08;
(Continued)

(56) References Cited

U.S. PATENT DOCUMENTS

| 811,343 | A | * | 1/1906 | Walker | F16L 33/035 24/20 TT |
| 3,235,925 | A | * | 2/1966 | Gerhardt | F16L 33/025 24/23 EE |

(Continued)

FOREIGN PATENT DOCUMENTS

| CN | 203348747 | 12/2013 |
| DE | 3434899 | 5/1985 |

(Continued)

OTHER PUBLICATIONS

Courbis Group: Polyurethanes propertie (Year: 2019).*
(Continued)

*Primary Examiner* — Steven M Marsh
(74) *Attorney, Agent, or Firm* — Grüneberg and Myers PLLC

(57) ABSTRACT

A fastening device is useful for at least one supply hose and/or at least one supply line for fastening to an industrial-robot arm with a holder, an assignable holder unit for the supply hose and/or the supply line, and a lockable tensioning element. The holder is arranged on the lockable tensioning element so that the holder, by the tensioning element being clasped and locked around the industrial-robot arm, can be fastened and/or positioned flexibly on the industrial-robot arm and thus in the event of the holder being connected to the assignable holding unit the supply hose and/or the supply line can be oriented in a specific manner.

19 Claims, 4 Drawing Sheets

(51) Int. Cl.
*F16L 3/015* (2006.01)
*F16L 3/10* (2006.01)
*F16L 3/16* (2006.01)
*F16L 33/03* (2006.01)
*F16L 33/035* (2006.01)

(58) Field of Classification Search
CPC ..... F16L 3/1008; F16L 3/1025; F16L 3/1033; F16L 3/1041; F16L 3/105; F16L 3/1058; F16L 33/03; F16L 33/035; F16L 33/025
USPC ...................................... 74/490.02
See application file for complete search history.

(56) References Cited

U.S. PATENT DOCUMENTS

| | | | | |
|---|---|---|---|---|
| 3,851,979 | A | * | 12/1974 | Becker ............... F16L 3/14 403/76 |
| 4,705,243 | A | | 11/1987 | Hartmann et al. |
| 5,437,207 | A | * | 8/1995 | Zimmer ............. B23K 11/318 414/918 |
| 5,474,268 | A | * | 12/1995 | Yu .................... A01G 17/08 248/61 |
| 5,777,267 | A | * | 7/1998 | Szydel ............. B25J 19/0025 174/72 A |
| 5,816,736 | A | * | 10/1998 | Kroulik ........... B25J 19/0025 403/389 |
| 5,937,488 | A | * | 8/1999 | Geiger ............... F16L 3/1033 24/339 |
| 6,431,018 | B1 | * | 8/2002 | Okada ............. B25J 19/0025 248/229.22 |
| 6,918,161 | B2 | | 7/2005 | Gyöngyösi |
| 7,520,475 | B2 | * | 4/2009 | Opperthauser ....... F16L 3/2431 248/71 |
| 7,861,982 | B1 | * | 1/2011 | McClure ............. F16B 7/0433 248/74.1 |
| 10,174,869 | B2 | * | 1/2019 | Erickson ............... F16L 3/222 |
| 10,180,200 | B2 | * | 1/2019 | Hoyvik .................. F16L 1/16 |
| 10,415,609 | B2 | * | 9/2019 | Golden ................. F16M 13/022 |
| 2002/0030144 | A1 | * | 3/2002 | Blane ................. H02G 9/065 248/74.1 |
| 2003/0217440 | A1 | | 11/2003 | Gyongyosi |
| 2006/0192059 | A1 | * | 8/2006 | Morello ............... F16L 3/16 248/74.3 |
| 2008/0283687 | A1 | * | 11/2008 | McClure .............. F16L 3/237 248/74.1 |
| 2009/0126162 | A1 | * | 5/2009 | Head .................. E21B 17/1035 24/115 K |
| 2009/0146019 | A1 | | 6/2009 | Choi |
| 2009/0265894 | A1 | * | 10/2009 | Link .................. F16L 33/035 24/16 PB |
| 2011/0186693 | A1 | * | 8/2011 | McMiles ............. F16L 3/08 248/65 |
| 2012/0275571 | A1 | * | 11/2012 | Neuber .................. A61B 6/56 378/194 |
| 2015/0026955 | A1 | * | 1/2015 | Rodrigue .............. F16L 3/1058 29/525.03 |
| 2015/0159781 | A1 | * | 6/2015 | Wilson ................. F16L 3/227 248/67.5 |
| 2017/0219128 | A1 | * | 8/2017 | Anderson ............... F16L 3/14 |
| 2018/0149290 | A1 | * | 5/2018 | Courbis ................. H02G 3/32 |
| 2019/0195394 | A1 | * | 6/2019 | Harrop ................. F16L 9/20 |

FOREIGN PATENT DOCUMENTS

| | | |
|---|---|---|
| DE | 88 14 906.4 U1 | 1/1989 |
| DE | 299 02 947 U1 | 7/1999 |
| DE | 201 09 419 U1 | 9/2001 |
| DE | 102 22 732 | 12/2003 |
| DE | 10 2007 008 985 | 8/2008 |
| JP | 2007-15057 | 1/2007 |
| JP | 2008-23680 | 2/2008 |
| KR | 10-0638637 | 10/2006 |
| KR | 10-2008-0001094 | 1/2008 |

OTHER PUBLICATIONS

Courbis Group: Polyurethanes properties (Year: 2019).*
International Preliminary Report on Patentability dated Oct. 1, 2019 in PCT/DE2018/200015 with English translation.
English translation of the Writen Opinion of the international Searching Authority dated Jun. 27, 2018 in PCT/DE2018/200015.
International Search Report dated Jun. 27, 2018 in PCT/DE2018/200015 with English translation.
Written Opinion dated Jun. 27, 2018 in PCT/DE2018/200015

* cited by examiner

FASTENING DEVICE FOR A SUPPLY HOSE AND/OR A SUPPLY LINE FOR FASTENING TO AN INDUSTRIAL-ROBOT ARM

CROSS-REFERENCE TO RELATED APPLICATIONS

This application is a National Stage entry under § 371 of International Application No. PCT/DE2018/200015, filed on Feb. 23, 2018, and which claims the benefit of German Application No. 10 2017 107 043.5, filed on Mar. 31, 2017.

BACKGROUND OF THE INVENTION

Field of the Invention

The invention relates to a fastening device for a supply hose and/or a supply line for fastening to an industrial-robot arm.

Discussion of the Background

Industrial-robot arms are used in industrial manufacturing and require a supply of power, media and/or data for their operation. For this purpose, usually corresponding hoses and/or control and power cables are guided from a central supply unit to the industrial-robot arm. These cables and hoses, such as for example an air hose, are guided along the robot arm either individually or bundled in a flexible supply hose.

Conventionally, supply hoses and/or supply lines are fastened to the robot arm with pipe clips. Mounting and dismounting pipe clips is however time-consuming, and while doing so damage to the robot arm may easily occur. In addition, the pipe clips, due to the fixed mounting, represent interfering contours which may interfere with and/or restrict the operation of a robot arm.

It is likewise known to guide supply hoses and/or supply lines along the robot arm within a rigid sleeve, for example made of plastics material, and/or to hold the supply hoses and/or lines in the desired position by means of a separately arranged additional arm. In both cases, however, the working range of the robot arm is restricted, and the risk of collision is increased.

Although supply hoses and supply lines can in principle also be guided within a robot arm, this makes maintenance and leak recognition more difficult. In addition, costly conversion is necessary if the industrial robot has to be adapted to a different application and/or a different tool which is to be supplied. In particular when using very small robots, there is no possibility of guiding supply hoses or supply lines within the very small robot arm due to the lack of space.

In addition, in particular very small robots are used in many and diverse applications and have to be equipped anew with supply hoses and/or supply lines each time in costly manner for a new application.

SUMMARY OF THE INVENTION

The object of the invention is to improve on the prior art.

This object is achieved by a fastening device for at least one supply hose and/or at least one supply line for fastening to an industrial-robot arm with a holder, an assignable holding unit for the supply hose and/or the supply line, and a lockable tensioning element, wherein the holder is arranged on the lockable tensioning element, so that the holder, by the tensioning element being clasped and locked around the industrial-robot arm, can be fastened and/or positioned flexibly on the industrial-robot arm and thus in the event of the holder being connected to the assignable holding unit the supply hose and/or the supply line can be oriented in a specific manner.

Thus, an adaptable fastening device is provided which can be positioned flexibly along the longitudinal direction of an industrial-robot arm and flexibly at any angle transversely to the longitudinal direction of the robot arm. Consequently, the fastening device for a supply hose and/or a supply line can be arranged at an optimum position on the industrial-robot arm without it adversely affecting the operation of the robot arm. As a result, interfering contours on the robot arm can be reduced and the risk of collision can be lessened.

Due to the clasping and locking with a tensioning element, in addition simple, rapid and secure fastening of the fastening device to the industrial-robot arm takes place. As a result, also rapid adaptation and/or correction of the fastening position and also rapid replacement of a fastening device, for example in the event of a defect or damage due to welding sparks, is possible.

It is particularly advantageous that due to the fastening device close guidance of the supply hose and/or the supply line along an outer contour of the robot arm takes place.

Due to the fact that the tensioning element can be locked in different tensioning-element lengths, the fastening device can be used for different robot types and/or robot-arm diameters. Consequently, the fastening device can be used and combined universally. In particular, the fastening device can also be combined with conventional holding means for supply hoses and/or supply lines, such as for example cable clips and/or tensioning clips.

One essential concept of the invention is based on the fact that a fastening device for a supply hose and/or supply line can be fastened flexibly and in easily detachable manner at any position of an industrial-robot arm by means of a tensioning element, the holder connected to the tensioning element being optimally adapted to the outer contour of the industrial-robot arm. Due to the fact that the holder can be connected to the holding unit for the supply hose and/or supply line, the supply hose and/or supply line is oriented and/or guided in defined manner on the industrial-robot arm.

DETAILED DESCRIPTION OF THE INVENTION

Figure 1:
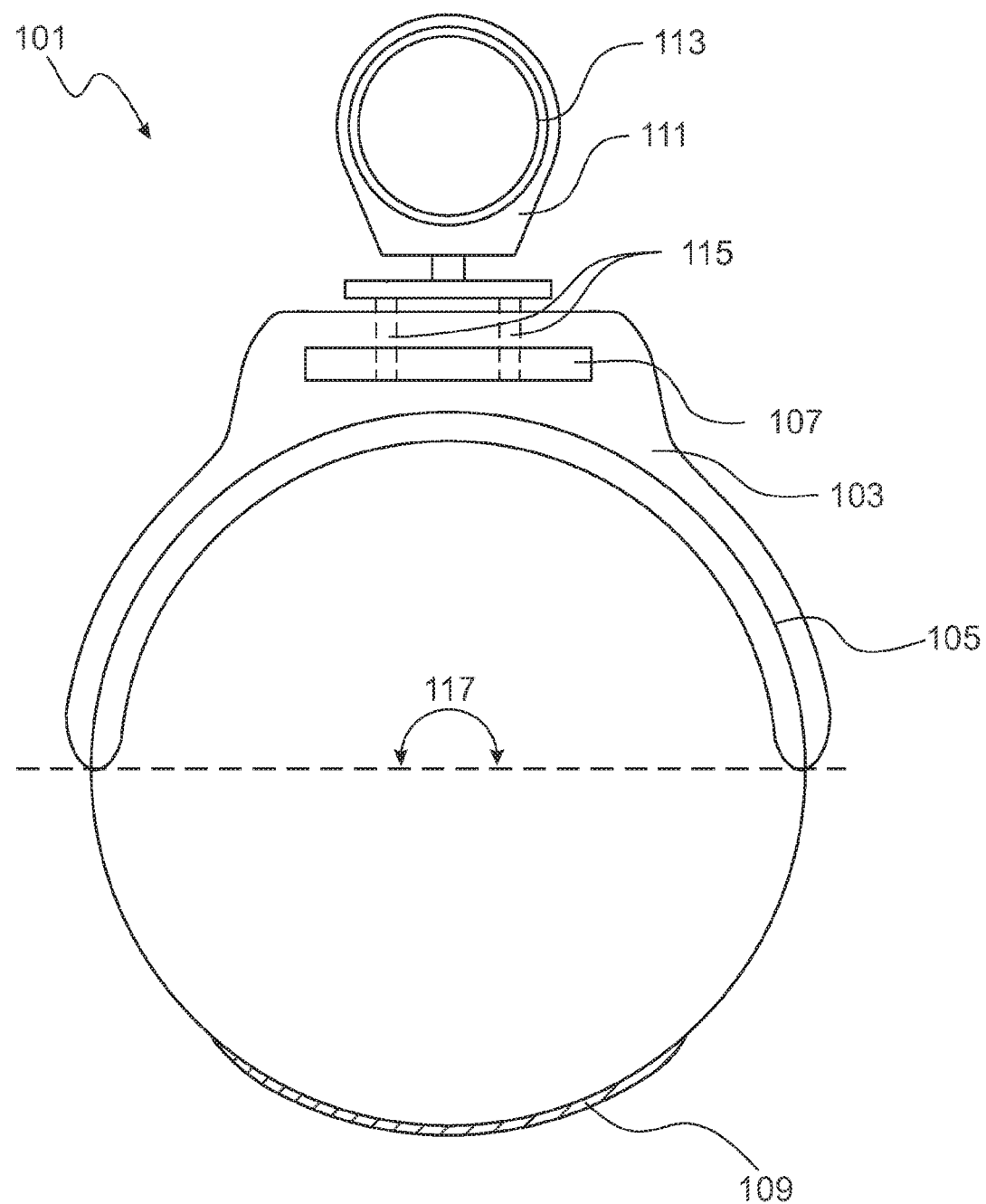
FIG. 1 is a schematic sectional view of a fastening holder with a corrugated hose.

The following terms are explained:

A "fastening device" is in particular a technical device for fastening and/or fixing a part to an industrial-robot arm, an operating means, operating device, machining equipment and/or a machine tool. A fastening device serves in particular for fastening a supply hose and/or supply line to an industrial-robot arm. A fastening device comprises in particular a holder and a lockable tensioning element.

A "supply hose" is in particular a flexible elongate hollow body with a defined cross-section which serves to supply an industrial robot with power, a medium and/or substance and/or information. In the supply hose, either in particular a medium or substance, such as for example water or compressed air, is guided directly, or a supply line or a plurality of supply lines and/or further hoses for supplying media is/are guided bundled in the supply hose. A supply hose may be in particular a corrugated hose, a corrugated tube and/or a smooth hose. The supply hose has in particular a nominal diameter of DN 8 to DN 100, preferably of DN 10 to DN 50. A supply hose has in particular a round, oval, angular and/or rectangular profile.

A "supply line" is in particular an electric line for transmitting electric current and/or information. A supply line comprises in particular an electrical conductor, for example in the form of a wire or a stranded wire, and/or an insulating covering. A supply line may in particular also be a cable, as a single-core or multi-core composite of cores (individual lines) which is sheathed with an insulating material. A supply line has in particular a round, oval, angular and/or rectangular profile.

An "industrial-robot arm" is in particular a movable arm of an industrial robot which serves as a universal, programmable machine for the handling, mounting or assembly and/or machining of workpieces. The industrial-robot arm comprises in particular a tool at its free arm end. The industrial-robot arm comprises in particular six or more axes of rotation. An industrial-robot arm is in particular the robot arm of a very small robot.

A "holder" is understood to mean in particular a device for holding an object. A holder serves in particular for holding the holding unit and/or a fixing plate, on which in turn the supply hose and/or the supply line is or are held. To this end, the holder comprises in particular a connecting unit and/or a receiving means. The holder is configured such that it adapts in particular optimally to the outer contour of an industrial-robot arm and/or is supported on the outer contour of the industrial-robot arm.

A "holding unit" is a holder for a supply hose and/or supply line. A holding unit may for example be a clip, clamp, tensioning clip and/or a jacket. The holding unit is in particular immobile or rotatable and/or pivotable. Alternatively, the holding unit may also be a hook-and-loop tape and/or other tensioning element which is guided externally around a supply hose and/or a supply line and is fastened to the holder directly and/or to a fixing plate. It is particularly advantageous if the hook-and-loop tape serves both for fastening the supply hose or the supply line to the holder and also at the same time for fastening the holder to the industrial-robot arm. Thus, in this case the holding unit and the tensioning element are identical and/or one part.

A "tensioning element" is in particular a band with a fastener for fastening and clasping an object. A tensioning element is tensioned and locked in particular around an industrial-robot arm. The band of the tensioning element is in particular woven and/or comprises plastics material. A tensioning element consists in particular of polypropylene, polyester, nylon and/or cotton.

"Clasp" is understood to mean in particular that the tensioning element, when clamped securely under tension, encloses the industrial-robot arm from the outside.

"Can be fastened and/or positioned flexibly" means in particular that the holder can be fastened at any position of the industrial-robot arm and is adaptable simply and easily in its position.

In a further embodiment of the fastening device, the lockable tensioning element is guided through an interior of the holder.

Owing to the fact that part of the length of the tensioning element is guided through an interior of the holder, upon clasping a pressure of the tensioning element is exerted on the underlying material of the holder in its interior. Consequently, the material of the holder, which upon clasping is located between the tensioning element and the industrial-robot arm, is optimally pressed and/or formed against the industrial-robot arm by the tensioning pressure.

Firstly, the lockable tensioning element in the interior of the holder can be firmly connected with the surrounding material of the holder, for example be sealed into the material of the holder. Secondly, the lockable tensioning element is arranged movably in the interior of the holder in that the holder has in its interior a cavity corresponding to the dimensions of the lockable tensioning element and the lockable tensioning element is introduced into this cavity through an opening in the holder and at another end of the holder leaves the cavity again through a second opening. The latter variant has the advantage that the holder is displaceable along the tensioning element and thus can be adapted even more easily in its position on the tensioning element to different robot-arm diameters.

In order optimally to enclose a robot arm, the lockable tensioning element is guided in a longitudinal direction of the holder.

Thus, the tensioning element due to being guided in the interior of the holder in the longitudinal direction along the longitudinal dimension of the holder can exert a tensioning pressure on the underlying material of the holder and press against the industrial-robot arm.

A "longitudinal direction" is the direction of the holder which corresponds to the direction of its greatest extent.

In order to prevent slipping of the fastening device on the industrial-robot arm, the holder comprises an elastic material, so that in the case of the tensioning element being clasped and locked around the industrial-robot arm the holder is positionally fixed by a frictional connection between the elastic material of the holder and a material of the industrial-robot arm.

Thus, by way of a frictional connection a positionally secured and reliable fastening device is ensured in addition to the tensioning element.

For better adaptability to different diameters of the industrial-robot arm, the holder is bendably flexible.

In particular due to the elastic material, the holder connected to the tensioning element is bendably flexible and deformable, so that it adapts optimally to the outer contour of the industrial-robot arm.

A "bendably flexible" holder is particularly advantageous since on being bent it exhibits elastic behavior and in particular after being bent deforms back again into the original form, so that the form of the bendably flexible holder does not have to be adapted in advance for a particular robot arm.

Due to an elastic and bendably flexible design of the holder, the supply hose and/or the supply line is or are subjected to a lower reversed bending stress due to the movement of the industrial-robot arm. Thus, the service life of the supply hose and/or the supply line is lengthened.

An "elastic material" is in particular an elastically deformable plastics material (elastomer). An elastic material is for example natural rubber or synthetic rubber. The elastic material stretches out in particular under a tensile load and contracts again after a drop in the tensile stress.

With a "frictional connection", a displacement of two objects is prevented in particular by static friction between the faces of these objects. In particular, the frictional connection causes the elastic material of the holder and the material of the industrial-robot arm not to be displaced against each other, so that the holder is positionally fixed on the industrial-robot arm.

"Positionally fixed" is understood to mean in particular that the position and/or location of the holder and of the industrial-robot arm relative to each other does not change.

In a further embodiment of the fastening device, the holder comprises polyurethane, in particular with a Shore hardness of 30° to 60° Shore A.

It is particularly advantageous to use polyurethane with a Shore hardness of 30° to 60° Shore A, preferably of 40° to 50° Shore A, for the holder, since as a result an optimum frictional connection with the material of the industrial-robot arm usually used, aluminum, is achieved.

Thus, a slip-resistant holder is provided which can be used on different surfaces, such as on cast material, aluminum, painted surfaces.

In order to make available a sufficient area for the frictional connection, in the case of the frictional connection the elastic material and/or the polyurethane of the holder encompasses an angular range of 90° to 230°, preferably 150° to 180°, transversely to a longitudinal direction of the industrial-robot arm.

In a further embodiment of the fastening device, the holder and/or the bendably flexible holder has at least one incision or a plurality of incisions on a contact face with the industrial-robot arm, so that the holder and/or the bendably flexible holder can be formed on the industrial-robot arm.

It is particularly advantageous if the contact face of the holder and/or of the bendably flexible holder which lies against the industrial-robot arm is formed unevenly and/or with incisions, so that the holder can be bent better at these incisions and thus be adapted and/or formed better to different robot-arm diameters. In addition, slip resistance can also be achieved by the uneven configuration.

An "incision" is in particular an indentation in the holder, the indentation being open on the side of the contact face of the holder with an industrial-robot arm. Preferably a holder has a plurality of incisions along its longitudinal direction, the incisions possibly having different forms, such as for example round, angular and/or triangular forms, and different depths of the incisions.

In a further embodiment of the fastening device, alternatively or additionally the holder can be positionally fixed reciprocally on the industrial-robot arm by a mechanical and/or chemical means.

As a result, slippage can be prevented even with a great weight of the supply line and/or the supply hose and also in the event of extensive movements and hence bending stresses.

A "mechanical and/or chemical means" is in particular a means which by mechanical and/or chemical forces prevents movement between the adjoining faces of the holder and of the industrial-robot arm. A "chemical means" may for example be a pressure-sensitive adhesive, it being possible for the pressure-sensitive adhesive to be permanently adhesive or re-detachable again. A "mechanical means" may for example be a projection on the holder which engages in a groove on the industrial-robot arm. As mechanical means, for example also a hook-and-loop tape with barbs may be arranged on the holder and an associated hook-and-loop tape with loops may be arranged on the industrial-robot arm, forming a hook-and-loop fastener.

In order to guarantee secure locking of the tensioning element even in the event of extensive movements of the industrial-robot arm, the lockable tensioning element comprises a hook-and-loop fastener, snap fastener, clamping fastener, press-on closure, cam-type fastener and/or D-ring fastener.

In a further embodiment, the fastening device comprises a fixing plate with at least one connecting unit for connecting the fixing plate to the assignable holding unit, and the fixing plate is arranged on the holder.

Due to the fact that a fixing plate is connected on the holder, which plate serves for the connection to the holder of the supply hose and/or supply line, despite the elasticity of the holder sufficient rigidity for holding the supply hose and/or supply line is guaranteed even in the event of an extensive movement of the industrial-robot arm. Thus, the supply hose and/or supply line is oriented and/or guided in defined manner on the industrial-robot arm.

A "fixing plate" is in particular a rigid plate to which a holding unit for the supply hose and/or the supply line can be or is connected. A fixing plate comprises for example a rigid material, such as metal and/or ceramic. The fixing plate comprises in particular a connecting unit which serves to firmly connect a holding unit for the supply hose and/or the supply line. A "connecting unit" may for example be a screw thread, a groove, a keyway and/or similar.

In a further embodiment of the fastening device, the holder comprises a receiving means, to which the fixing plate can be attached or into which it can be introduced, so that the fixing plate is exchangeable.

Thus, an optimum connection between the holder and the fixing plate is guaranteed by way of the receiving means.

It is particularly advantageous that the receiving means is embodied such that by tensile stress on the holder during the clasping the receiving means is also deformed such that the fixing plate is pressed against the holder and thus in the direction of the industrial-robot arm. Thus, it is advantageous if the receiving means and/or the holder at least partially enclose(s) the fixing plate.

Thus, an exchangeable fixing plate complete with the holding unit for the supply hose and/or the supply line can be changed without the holding unit having to be dismounted from the connecting unit of the fixing plate.

A "receiving means" is in particular a slot, incision or cavity in the holder, on which the fixing plate can be placed or into which it can be inserted.

In order to achieve a stable position of the fixing plate, the fixing plate is arranged within the holder, the at least one connecting unit for connecting to the holding unit being accessible from the outside.

Owing to the arrangement of the fixing plate within the holder, in the event of the tensioning strap being tensioned a tensile stress is transmitted from the holder to the fixing plate, so that the fixing plate is pressed against the underlying tensioning strap and the industrial-robot arm. Thus, positional fixing of the fixing plate and the holding unit connected thereto with the supply line and/or the supply hose is achieved.

In a further embodiment, the fastening device and/or the fastening means comprises or comprise the holding unit and/or the supply hose and/or the supply line, so that the supply hose and/or the supply line can be guided along an outer contour of the industrial-robot arm.

Thus, the supply line and/or the supply hose can be guided closely along an outer contour of the industrial-robot arm and nevertheless be subjected to a low reversed bending stress.

In order to permit use on different industrial-robot arms, the holder has a round, oval, angular and/or rectangular profile.

As a result, the holder, depending on its profile, lies directly against the industrial-robot arm or is supported at one point or several points on the industrial-robot arm. Thus, also a distance of the supply hose and/or supply line from the industrial-robot arm can be set by way of the form of the holder.

In a further aspect of the invention, this object is achieved by an industrial-robot arm for handling, assembly and/or machining of a workpiece, wherein the industrial-robot arm comprises at least one supply hose and/or at least one supply line for supplying power, media and/or signals and at least one fastening device, wherein the fastening device is fastened to the industrial-robot arm and comprises a holder, an assignable holding unit for the supply hose and/or the supply line and a lockable tensioning element, wherein the holding unit is connected to the holder, the holder is arranged on the lockable tensioning element and the holder, by the tensioning element being clasped and locked around the industrial-robot arm, is fastened and/or positioned flexibly on the industrial-robot arm, so that the supply hose and/or the supply line is or are oriented in a specific manner.

In a further embodiment of the industrial-robot arm, the fastening device is a fastening device previously described or the supply hose and/or the supply line is or are a supply hose previously described and/or a supply line previously described.

Figure 2:
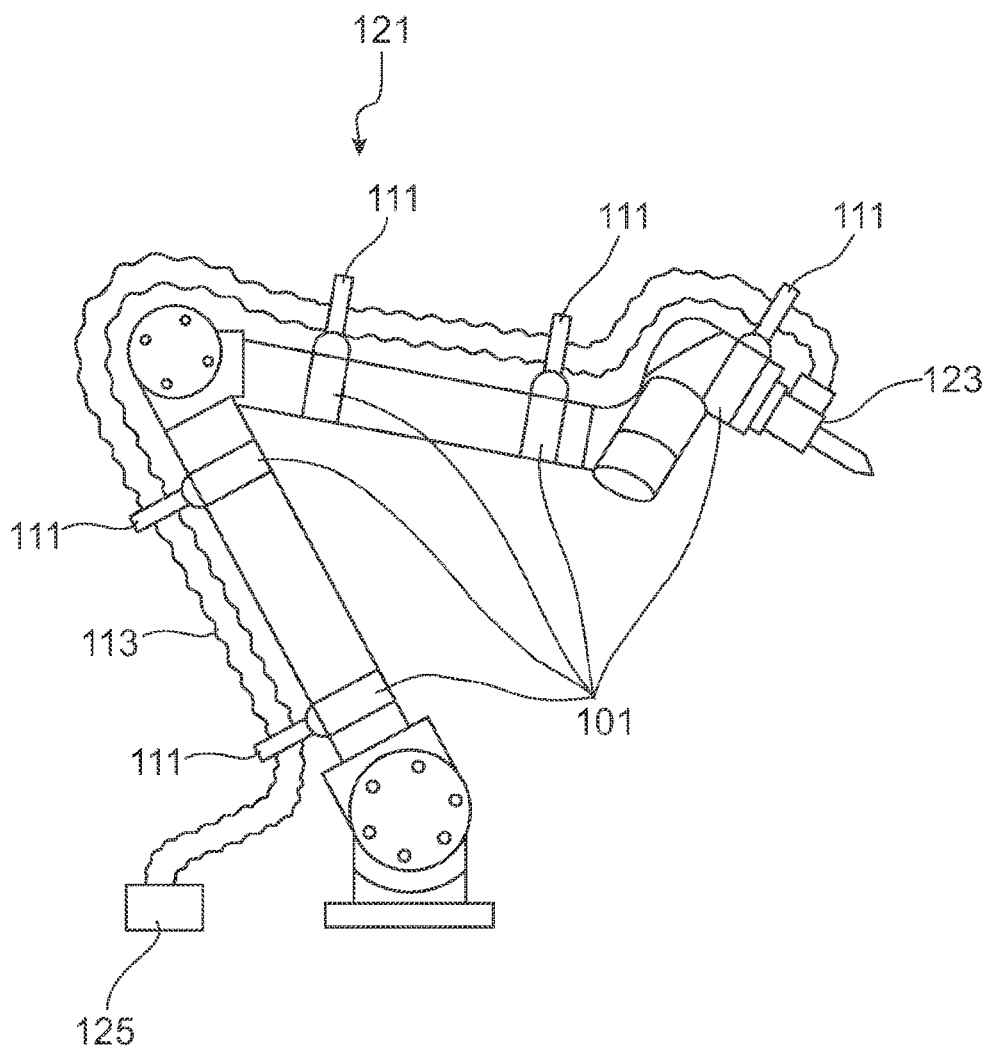
FIG. 2 is a schematic sectional view of an industrial-robot arm with five fastening holders and a corrugated hose.
Figure 3:
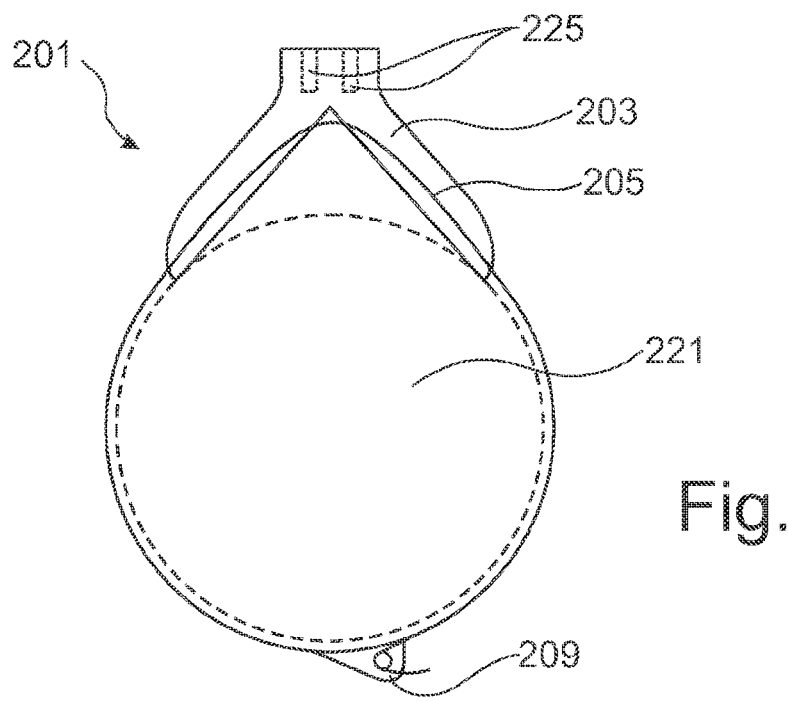
FIG. 3 is a schematic sectional view of a fastening holder with a rigid holder on an industrial-robot arm with a large diameter.
Figure 4:
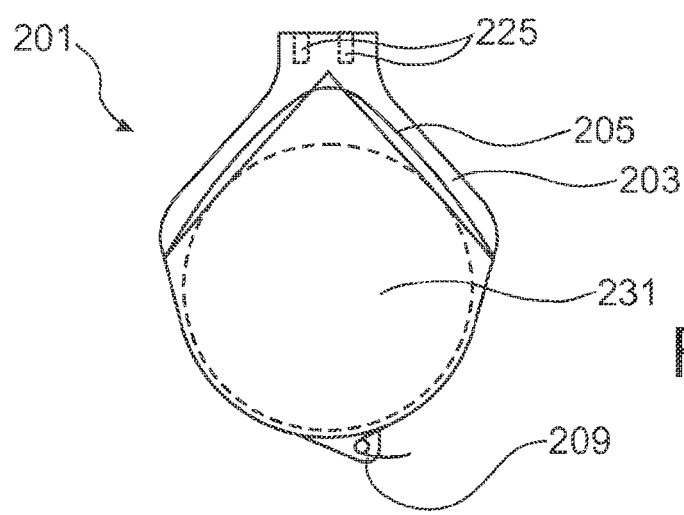
FIG. 4 is a schematic sectional view of a fastening holder with a rigid holder on an industrial-robot arm with a medium diameter.
Figure 5:
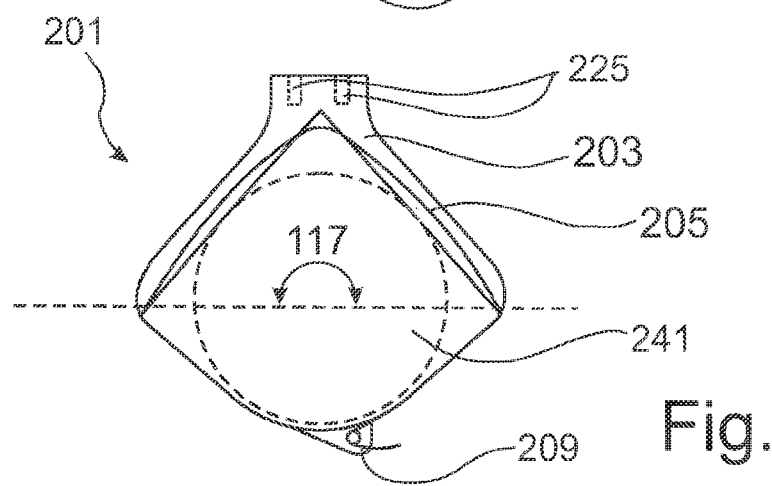
FIG. 5 is a schematic sectional view of a fastening holder with a rigid holder on an industrial-robot arm with a small diameter.
Figure 6:
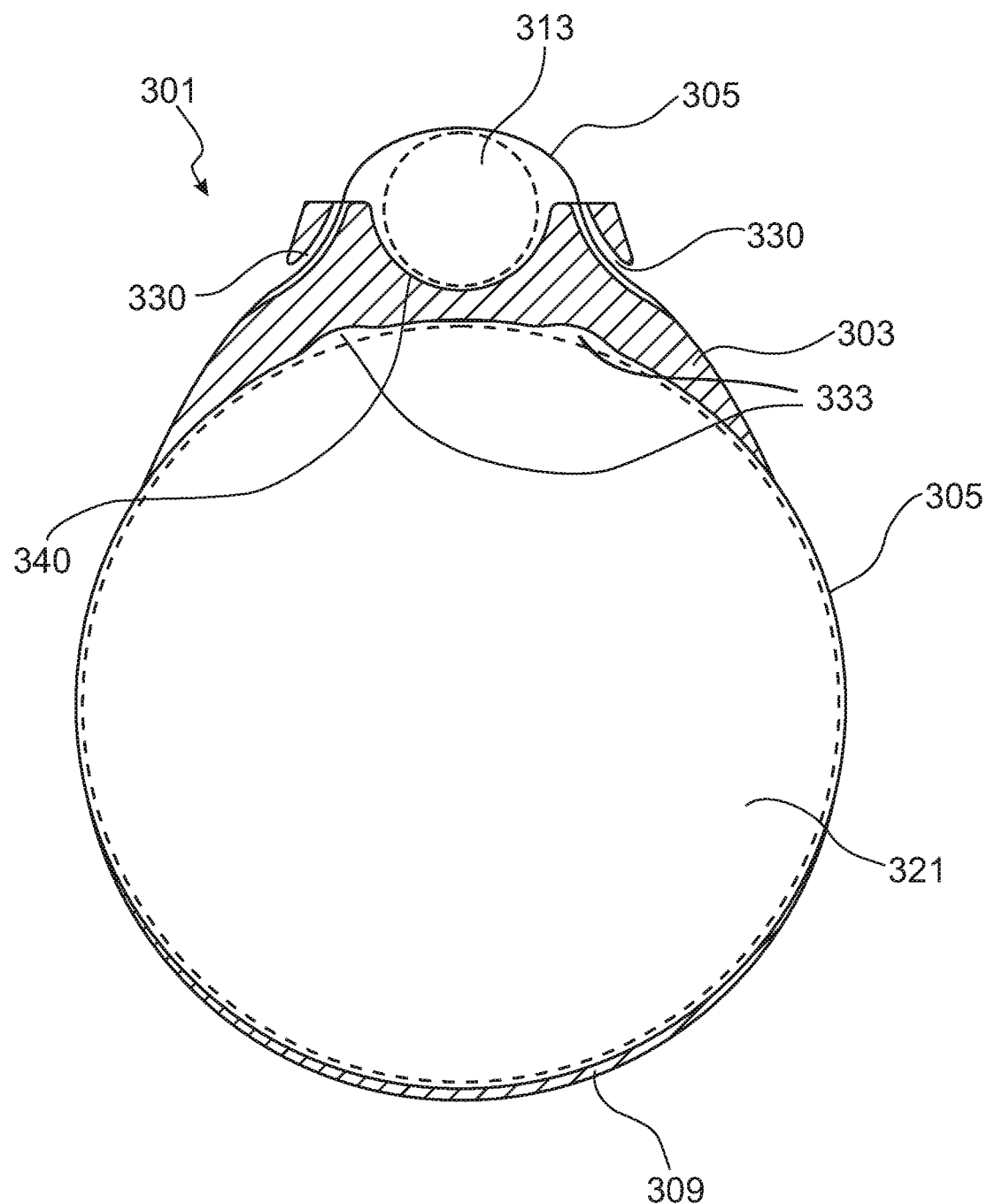
FIG. 6 is a schematic sectional view of a fastening holder with a PU holder and a hook-and-loop tape for simultaneously fastening a corrugated tube to the PU holder and fastening the PU holder to an industrial-robot arm.

The invention will be discussed in greater detail below with reference to examples of embodiment. Therein:

FIG. 1 is a schematic sectional view of a fastening holder with a corrugated hose, FIG. 2 is a schematic sectional view of an industrial-robot arm with five fastening holders and a corrugated hose, FIG. 3 is a schematic sectional view of a fastening holder with a rigid holder on an industrial-robot arm with a large diameter, FIG. 4 is a schematic sectional view of a fastening holder with a rigid holder on an industrial-robot arm with a medium diameter, FIG. 5 is a schematic sectional view of a fastening holder with a rigid holder on an industrial-robot arm with a small diameter, and FIG. 6 is a schematic sectional view of a fastening holder with a PU holder and a hook-and-loop tape for simultaneously fastening a corrugated tube to the PU holder and fastening the PU holder to an industrial-robot arm.

A fastening holder 101 comprises a belt strap 105, and the belt strap 105 comprises a hook-and-loop fastener 109 at both its ends. Furthermore, the fastening holder 101 comprises a PU holder 103 and a steel plate 107. The belt strap 105 is guided through the interior of the PU holder 103, with, in the case of the belt strap 105 which is closed by the hook-and-loop fastener 109, the PU holder 103 assuming a length corresponding to an angle 117 of 180° of the length of the closed belt strap 105 and also an angle 117 of 180° of a periphery of an industrial-robot arm 121 which is to be enclosed.

The steel plate 107 is arranged within a cavity in the interior of the PU holder 103. The steel plate 107 comprises two screw threads, into which two screws 115 of a pivotable clip 111 are screwed. In this case, the two screws 115 are guided into the steel plate 107 through two openings in the PU holder 103. The pivotable clip 111 bears a corrugated hose 113 in its interior. The corrugated hose has a nominal diameter of DN 25.

An industrial-robot arm 121 comprises six axes of rotation. At the end of the industrial-robot arm 121 there is arranged an assembly tool 123 for assembling workpieces. The assembly tool 123 is connected to a central supply means 125 by way of the corrugated hose 113. In the corrugated hose 113, a power supply line, a signal line and an air hose are guided from the central supply means 125 to the tool 123.

At five positions along the industrial-robot arm 121, five fastening holders 101 have been positioned and fastened by tightening the respective belt strap 105 and locking by means of the respective hook-and-loop fastener 109. The fastening holders 101 are positionally fixed by a frictional connection between a face of the respective PU holder 103 which lies in each case against the industrial-robot arm 121 and a contacting face of the industrial-robot arm 121, which consists of aluminum.

The corrugated hose 113 is connected to the five fastening holders 101 in each case by means of pivotable clips 111, so that the corrugated hose 113 is guided closely along the industrial-robot arm 121.

Owing to the elastic PU holder 103 of each fastening holder 101, the corrugated hose 113 is guided in a bendably flexible manner along the industrial-robot arm 121 and owing to movements of the industrial-robot arm 121 during assembly is subject to only slight bending stresses. Due to the close guidance of the corrugated hose 113, no interfering contours due to the fastening holders 101 occur in the working range of the industrial-robot arm 121. Thus, an optimum power, signal and compressed-air supply to the industrial-robot arm 121 takes place by way of the closely guided corrugated hose 113, without the operation of the industrial-robot arm 121 being impaired when assembling the workpieces.

In one alternative, a fastening holder 201 comprises a rigid holder 203 made of an acrylic/butadiene/styrene copolymer. Furthermore, the fastening holder 201 comprises a polyester band 205 with a clamping fastener 209.

The rigid holder 203 is formed to be angular on its inner side of its two limbs and comprises two screw threads 225 on its upper side. The polyester band 205 is guided through the rigid holder 203.

For fastening around an industrial-robot arm 221, the polyester band 205 with the rigid holder 203 is tensioned around the industrial-robot arm 221 and tightened and locked by means of the hook-and-loop fastener 209.

The industrial-robot arm 221 has a large diameter of 250 mm, so that the rigid holder 203 lies with the two ends of its limbs on an upper portion of a periphery of the industrial-robot arm 221, with a distance between the two limbs encompassing a 900 angle of a periphery of the industrial-robot arm 221.

Then a clamping clip, not shown, is screwed into the screw thread 225 by means of screws and a supply hose, not shown, which carries a plurality of data and power cables in its interior, is clamped into the clamping clip.

After the fastening holder 201 has been used on the industrial-robot arm 221, the fastening holder 201 with the rigid holder 203 is fastened correspondingly to an industrial-robot arm 231. The industrial-robot arm 231 has an average diameter of 150 mm, so that the rigid holder 203 lies on the industrial-robot arm 231 not with the ends of its two limbs but on its inner sides. In this case, the rigid holder 203 encompasses an angle of 135° of a periphery of the industrial-robot arm 231.

In a later application, the fastening holder 201 with the rigid holder 203 is fastened analogously to an industrial-robot arm 241 with a small diameter of 75 mm. The rigid holder 203 lies centrally on the inner sides of its limbs on the industrial-robot arm 241 and encompasses overall an angle 117 of 180° of a periphery of the industrial-robot arm 241.

Thus, the fastening holder 201 with the rigid holder 203 can be used flexibly for different industrial-robot arms.

In a further alternative, a fastening holder 301 comprises a flexible PU holder 303, a hook-and-loop tape 305 with a hook-and-loop fastener 309, and a semicircular receptacle 340. The PU holder 303 comprises laterally two introduction slots 330, through which the hook-and-loop tape 305 is guided in each case through the upper part of the PU holder 303. Along both limbs of the PU holder 303, the hook-and-loop tape 305 lies in each case externally between a guide.

For mounting, the hook-and-loop tape 305 is introduced through the introduction slots 330 and thereby forms a semicircle over the semicircular receptacle 340. Then the fastening holder 301 is positioned at an intended point externally on an industrial-robot arm 321. A corrugated tube 313 with an external diameter of 29.4 mm is passed through between the upper hook-and-loop tape 305 and the PU holder 303 and laid in the semicircular receptacle 340 of the PU holder 303. The hook-and-loop tape 305 is tightened around the corrugated tube 313 and the industrial-robot arm 321 and locked by means of the hook-and-loop fastener 309. As a result, at the same time in one operating step the corrugated tube 313 is fastened to the PU holder 303, and the PU holder 303 to the industrial-robot arm 321. Owing to an uneven embodiment of the PU holder 303 due to incisions 333 on an inner contact face with the industrial-robot arm 321, the PU holder 303 is better adaptable to a diameter of the industrial-robot arm 321 and slip-resistant.

Thus, a fastening holder 301 is provided which, free from the use of screws and tools, makes possible rapid installation and in addition has a very low overall height which is only slightly above a height of the corrugated tube 313.

The invention claimed is:

1. A fastening device for at least one of one or more supply hoses and one or more supply line for fastening to an industrial-robot arm, said fastening device comprising:
a holder,
an assignable holding unit for the at least one of or more supply hoses and one or more supply lines, and
a single lockable tensioning element,
wherein the holder is arranged on the single lockable tensioning element, so that the holder, by the single lockable tensioning element being clasped and locked around the industrial-robot arm, can be at least one of fastened and positioned flexibly on the industrial-robot arm, wherein the single lockable tensioning element extends around the industrial robot arm and the at least one of one or more supply hoses and one or more supply lines, and thus, in an event of the holder being connected to the assignable holding unit, the at least one of one or more supply hoses and one or more supply lines can be oriented in a specific manner.

2. The fastening device according to claim 1, wherein the single lockable tensioning element is guided through an interior of the holder.

3. The fastening device according to claim 2, wherein the single lockable tensioning element is guided in a longitudinal direction of the holder.

4. The fastening device according to claim 1, wherein the holder comprises an elastic material, so that in the event of the single lockable tensioning element being clasped and locked around the industrial-robot arm, the holder is positionally fixed by a frictional connection between the elastic material of the holder and a material of the industrial-robot arm.

5. The fastening device according to claim 4, wherein the holder comprises polyurethane.

6. The fastening device according to claim 4, wherein in the case of the frictional connection, the elastic material of the holder encompasses an angular range of 90° to 230° transversely to a longitudinal direction of the industrial-robot arm.

7. The fastening device according to claim 4, wherein the holder is bendably flexible, so that the holder can be adapted to different diameters of the industrial-robot arm.

8. The fastening device according to claim 1, wherein the holder comprises at least one incision on a contact face with the industrial-robot arm, so that the holder can be formed on the industrial-robot arm.

9. The fastening device according to claim 1, wherein the holder can be positionally fixed reciprocally on the industrial-robot arm at least one of mechanically and chemically.

10. The fastening device according to claim 1, wherein the single lockable tensioning element comprises at least one of a hook-and-loop fastener, a snap fastener, a clamping fastener, a press-on closure, a cam-type fastener, and a D-ring fastener.

11. The fastening device according to claim 1, wherein the fastening device comprises a fixing plate with at least one connecting unit for connecting the fixing plate to the assignable holding unit, and the fixing plate is arranged on the holder.

12. The fastening device according to claim 11, wherein the holder comprises a receiver, to which the fixing plate can be attached or into which it can be introduced, so that the fixing plate is exchangeable.

13. The fastening device according to claim 12, wherein the fixing plate is arranged within the holder, and the at least one connecting unit for connecting to the assignable holding unit is accessible from the outside.

14. The fastening device according to claim 1, further comprising the at least one of one or more supply hoses and one or more supply lines, so that the at least one of one or more supply hoses and one or more supply lines can be guided along an outer contour of the industrial-robot arm.

15. The fastening device according to claim 1, wherein the holder has a profile selected from the group consisting of a round profile, an oval profile, an angular profile, and a rectangular profile.

16. The fastening device according to claim 5, wherein the polyurethane has a Shore hardness of 30° to 60° Shore A.

17. The fastening device according to claim 5, wherein in the case of the frictional connection, the polyurethane of the holder encompasses an angular range of 90° to 230° transversely to a longitudinal direction of the industrial-robot arm.

18. The fastening device according to claim 4, wherein in the case of the frictional connection, the elastic material of the holder encompasses an angular range of 150° to 180° transversely to a longitudinal direction of the industrial-robot arm.

19. A method of fastening at least one of one or more supply hoses and one or more supply line to an industrial-robot arm, the method comprising:
   holding the at least one of one or more supply hoses and one or more supply lines onto the fastening device according to claim 1, wherein the holding is achieved by the assignable holding unit,
   positioning the fastening device on the industrial-robot arm, and
   clasping and locking the fastening device to the industrial-robot arm,
   wherein the at least one of one or more supply hoses and one or more supply lines can be oriented in a specific manner.

* * * * *